United States Patent
Bichler (10) Patent No.: US 9,772,060 B2
(45) Date of Patent: Sep. 26, 2017

(54) TRAVELLING DEVICE FOR AN APPARATUS FOR REHABILITATING PIPELINES AND SUCH AN APPARATUS

(75) Inventor: Andreas Bichler, Tirol (AT)

(73) Assignee: TRELLEBORG PIPE SEALS DUISBURG GMBH (DE)

(*) Notice: Subject to any disclaimer, the term of this patent is extended or adjusted under 35 U.S.C. 154(b) by 160 days.

(21) Appl. No.: 14/112,798

(22) PCT Filed: Apr. 19, 2012

(86) PCT No.: PCT/EP2012/057138
§ 371 (c)(1),
(2), (4) Date: Jan. 8, 2014

(87) PCT Pub. No.: WO2012/143430
PCT Pub. Date: Oct. 26, 2012

(65) Prior Publication Data
US 2014/0165870 A1    Jun. 19, 2014

Related U.S. Application Data (60) Provisional application No. 61/477,287, filed on Apr. 20, 2011.

(30) Foreign Application Priority Data

Apr. 20, 2011  (DE) .................. 10 2011 007 827

(51) Int. Cl.
*F16L 55/28* (2006.01)
*E03F 3/06* (2006.01)
(Continued)

(52) U.S. Cl.
CPC ............. *F16L 55/28* (2013.01); *E03F 3/06* (2013.01); *F16L 55/179* (2013.01); *F16L 55/265* (2013.01); *F16L 55/44* (2013.01)

(58) Field of Classification Search
CPC ....... F16L 2101/30; F16L 55/30; F16L 55/26; F16L 55/265; F16L 55/28; F16L 55/34;
(Continued)

(56) References Cited

U.S. PATENT DOCUMENTS 2,604,521 A * 7/1952 Boucher ................. F16L 55/30
104/138.2
4,369,713 A * 1/1983 Richardson ............. B08B 9/049
104/138.2
(Continued)

FOREIGN PATENT DOCUMENTS

DE    29808035 U1    3/1998
DE    19715616 A1    1/1999
(Continued)

*Primary Examiner* — Mark Le
(74) *Attorney, Agent, or Firm* — Dickinson Wright PLLC (57) ABSTRACT

A travelling device for an apparatus for rehabilitating pipelines, including an adjustable undercarriage and a support device to which the undercarriage is fastened. The undercarriage includes a plurality of wheel sets, each wheel set having at least two wheels, wherein the wheels of a wheel set are rotatably mounted on a wheel holding element. The wheel holding element includes a spacer positioned intermediate the at least two wheels, the spacer configured so that the wheels of the wheel sets do not jam in the pipeline when moving the device.

11 Claims, 7 Drawing Sheets

(51) Int. Cl.
*F16L 55/179* (2006.01)
*F16L 55/26* (2006.01)
*F16L 55/44* (2006.01)

(58) Field of Classification Search
CPC ......... F16L 55/40; F16L 55/44; F16L 55/179; B08B 9/049; B08B 9/04; B08B 9/043; E21B 17/1021; E21B 2023/008
USPC ...................................... 104/138.2
See application file for complete search history.

(56) References Cited

U.S. PATENT DOCUMENTS

| | | | |
|---|---|---|---|
| 4,557,327 A * | 12/1985 | Kinley | E21B 17/1021 166/172 |
| 6,123,027 A | 9/2000 | Suyama | |
| 6,520,719 B1 | 2/2003 | Tweedie | |
| 7,334,642 B2 * | 2/2008 | Doering | E21B 4/18 166/206 |
| 7,505,063 B1 * | 3/2009 | Bastedo | B08B 9/043 15/104.05 |
| 7,614,109 B2 * | 11/2009 | Filippovitch | B08B 9/0557 15/104.061 |
| 2008/0098834 A1 * | 5/2008 | Sergoyan | F16L 55/32 73/866.5 |
| 2010/0314561 A1 | 12/2010 | Reutemann | |

FOREIGN PATENT DOCUMENTS

| | | |
|---|---|---|
| DE | 102004059892 A1 | 6/2006 |
| DE | 102008022003 A1 | 5/2009 |
| DE | 102009025829 A1 | 11/2010 |
| EP | 1519100 B1 | 3/2005 |

* cited by examiner

TRAVELLING DEVICE FOR AN APPARATUS FOR REHABILITATING PIPELINES AND SUCH AN APPARATUS

CROSS REFERENCE TO RELATED APPLICATIONS

The present application is a 35 U.S.C. §371 national stage filing of International Patent Application No. PCT/EP2012/057138, filed Apr. 19, 2012, and through which priority is claimed to German Patent Application No. 10 2011 007 827.4, filed Apr. 20, 2011, and United States Provisional Application 61/477,287, filed Apr. 20, 2011, the disclosures of which are incorporated herein by reference in their entireties.

FIELD OF THE INVENTION

The present invention relates to a travelling device for an apparatus for rehabilitating pipelines. This travelling device comprises an adjustable undercarriage comprising a plurality of wheels and a support device to which the undercarriage is fastened.

Such apparatuses for rehabilitating pipelines are used in the field of sewers, but also in the field of buildings. In particular, main lines, lateral lines, in particular house connection pipes and their connecting regions are to be rehabilitated. At these connecting regions, in particular, leaks and/or cracks frequently occur. By introducing a lining element, leaky sections of lines and in particular of line connecting regions can be repaired. During the rehabilitation process, a lining element is provided with an adhesive for the permanent joining to the inside of the pipe wall, in particular with a curable resin. The lining element preferentially comprises a layer of resin-absorbent material, in particular a non-woven or fibre material. In order to bring the lining element into the desired position to be rehabilitated, the apparatus for rehabilitating pipelines mentioned at the outset is used. Following the positioning and application of the lining element in the location to be rehabilitated and following the curing of the resin, the lining element is connected to the pipe inner wall through positive and frictional connection.

DESCRIPTION OF RELATED ART

In order to be able to transport or move such an apparatus for rehabilitating pipelines in a pipeline to the rehabilitation location and away from the latter it is known to use a travelling device with a plurality of wheels or a carriage device with a plurality of runners or a plate. Here it is known that the travelling device with its wheels in the lower region can be moved along the pipe inner wall.

A conventional apparatus for rehabilitating pipelines, which is frequently also called packer, is known from EP 1 519 100 B1. The packer disclosed there comprises a support structure in the form of an elongated packer rod, to which the function units of the rehabilitation apparatus are fastened. In order to be able to move the rehabilitation apparatus in the pipeline, an undercarriage with three guide wheels each is provided in the region of the two ends of the rehabilitation apparatus, wherein the three guide wheels bear against the pipe inner wall distributed over the circumference. The guide wheels are attached to a support device by means of braces, i.e. to the packer rod, as fixed basis. By means of a spring, the spreadable braces are pushed into a spread-open position via a common guide sleeve. In this manner, the packer rod and thus the rehabilitation apparatus are guided by the undercarriage substantially in the middle of the pipeline in an elastically resilient manner.

However, it has transpired in practical application that the movability of the undercarriage in the region of a lateral pipe connection is restricted and the undercarriage is not adjustable to a wide range of pipe diameter sizes. Thus, in the region of a connection of a lateral pipeline to a main pipeline, which forms the most frequent rehabilitation location, a jamming of the undercarriage can occur under certain conditions in the case of a larger diameter of the lateral pipe or in the case of irregularities on the inner wall of the main pipeline even in the case of a minor deflection of the guide wheels.

BRIEF SUMMARY OF THE INVENTION

The invention is based on the object of creating a travelling device for an apparatus for rehabilitating pipelines with an adjustable undercarriage, wherein the movability of the undercarriage in the region of a connection of a lateral pipeline and the adjustability of the undercarriage are improved.

The travelling device according to the invention can also be called travelling unit, transport device or transport unit. The apparatus for rehabilitating pipelines can also be called rehabilitation apparatus or packer. The support device preferentially forms a fixed base and preferentially extends substantially along a longitudinal direction, which substantially corresponds to the longitudinal axis of the pipeline.

To solve the abovementioned object it is proposed with a travelling device of the type mentioned at the outset, that a plurality of wheel sets are provided and each wheel set comprises at least two wheels, wherein the wheels of a wheel set are rotatably mounted on a wheel holding element. In this manner, a travelling device is created, wherein the at least two wheels rotatably mounted on the wheel holding element of each wheel set as a consequence of the two bearing points of the wheel against the pipe inner wall for each wheel set make possible a stable movability and a stable adjustability of the undercarriage for adaptation to different pipe diameters. In addition, an accurately centred position of the rehabilitation apparatus in the pipeline can be guaranteed in this way.

The adjustability of the undercarriage makes it possible to adjust the travelling device to different size pipe diameters. In order to provide the adjustability it is preferentially provided that the undercarriage with its wheels is pressed against the pipe inner wall of the pipeline in an elastically resilient manner. The elastic spring suspension of the undercarriage is preferentially configured such that a predefined adjusting travel range can be achieved. The adjusting travel of the undercarriage can for example be also understood as lifting travel. The adjusting travel of the undercarriage is substantially orientated in radial direction. By providing a plurality of wheel sets which are preferentially evenly distributed along the circumference of the pipe inner wall of the pipeline, a stable guidance and movability is ensured. At the same time, jamming of one or a plurality of wheels of the undercarriage in the region of a lateral pipe connection can be reduced or prevented by this, since each of the wheel sets with regular guidance has two support points along the pipe inner wall and the two wheels are connected to a wheel holding element. The wheel holding element can be embodied in one or multiple parts. Preferentially it is unitary.

With a preferred embodiment, on a first end of the wheel holding element a first wheel and on a second end of the wheel holding element a second wheel are rotatably mounted. In particular, the rotary axis of each of the two wheels is positioned in the region of the wheel holding element end so that the wheel outer circumference protrudes over the end edge of the wheel holding element end. Because of this there exists the possibility, in the event that a wheel is jammed only minimally, that the travelling device can still be freed from this situation, since the wheel can roll off at the jammed point.

With a further preferred embodiment, the wheel holding element is adjustably connected to the support device by means of braces. Preferentially, each wheel holding element is adjustably connected or coupled to the support device by means of two braces. By means of these braces, a lifting movement for adjusting the undercarriage and adapting to different pipe diameters can be achieved. Preferentially, at least a plurality of the braces are embodied as scissor linkage. Additionally preferentially, two braces each can form a scissor linkage or all braces can form a scissor linkage.

It is preferred, furthermore, that the wheel holding element comprises a guide groove, in which an end of a brace is guided. Within the scope of the travelling device according to the invention, a brace can also be understood as multiple-part brace, in particular as double brace.

With a further preferred embodiment, the wheel holding element comprises a spacer, which is configured in such a manner that one of the wheels or one of the wheel holding elements does not jam in the pipeline when moving the device. The pipeline can be the main pipeline or the lateral pipeline connected thereto. In other words, the spacer serves to be able to maintain a distance between the inner wall of the pipeline and the outer edge of the wheel holding element located opposite. This distance should preferentially be so large that the wheel outer edge is not displaced into the region of a lateral pipe connection when moving the travelling device.

In a preferred configuration, the spacer is formed by a protrusion of the wheel holding element. Preferentially, the protrusion is formed in the shape of an arc, in particular in the shape of a bulge. In this manner it is ensured that the travelling device with its spacer is not jammed against the pipe inner wall of the main pipeline.

With a further preferred configuration, a first connection unit and a second connection unit can be provided. The first connection unit is attached to the support device in a fixed manner. The second connection unit is arranged moveably, in particular displaceably, with respect to the support device, wherein a brace of each wheel set is rotatably connected to the first connection unit and another brace of each wheel set is rotatably connected to the second connection unit. Preferentially, the second connection unit is displaceably guided on the support device. The two connection units are preferentially embodied as sleeve. Such a sleeve can be attached in a space-saving manner about the support device, for example a rod element, and guided on the latter.

In a preferred configuration, the second connection unit is preloaded by means of at least one spring unit in such a manner that the wheels are pushed in the direction away from the support device. In this way, a predefined adjusting travel range or lifting range is provided for the adjustability of the undercarriage. Furthermore, a certain contact pressure is made possible in order to be able to properly move the travelling unit and thus the rehabilitation apparatus in the pipeline accordingly. The spring unit can preferentially be formed by a spring, in particular a compression spring or a coil spring. The one end of the spring can be attached to the first connection unit and the other end of the spring can be attached to the second connection unit. The fastening of the spring ends to the connection units can in particular take place as releasable fastening in order to make possible a simple and quick exchanging of the springs. Thus, depending on the pipe diameter of the pipeline, a suitable set of springs with a predefined spring force can be selected. With a preferred variant, only one spring unit is provided, which can be guided on the support device. Alternatively or additionally, the spring unit can be arranged about the support device. With another preferred variant, at least two spring units are provided. These can be arranged located opposite with respect to the support device. For example, four spring units can be provided.

With a further preferred configuration, at least one adjusting unit is provided with which the at least one spring unit and/or the maximum adjustment of the undercarriage is adjustable relative to the support device. The adjusting unit preferentially is an adjusting nut. Preferentially, two adjusting units are provided, wherein by means of the first adjusting unit the spring unit and by means of the second adjusting unit the maximum adjustment of the undercarriage can be adjusted. In other words, the spreading angle or opening angle of the brace mechanism or of the braces can be adjusted with the second adjusting unit.

It can be provided, furthermore, that the support device comprises at least one coupling device for connecting the undercarriage to a support structure of the apparatus for rehabilitating pipelines.

The support device can preferentially be a hollow cylinder element or a rod element or comprise such.

As further solution of the above mentioned object an apparatus for rehabilitating pipelines with at least one travelling device according to the invention is proposed. In particular, the apparatus can comprise a support structure, to which the support device of the travelling device is fastened.

In the following, the travelling device according to the invention and the apparatus for rehabilitating pipelines according to the invention are explained in more detail on the basis of the enclosed drawings. These shows schematically:

DETAILED DESCRIPTION OF THE INVENTION

Figure 1:
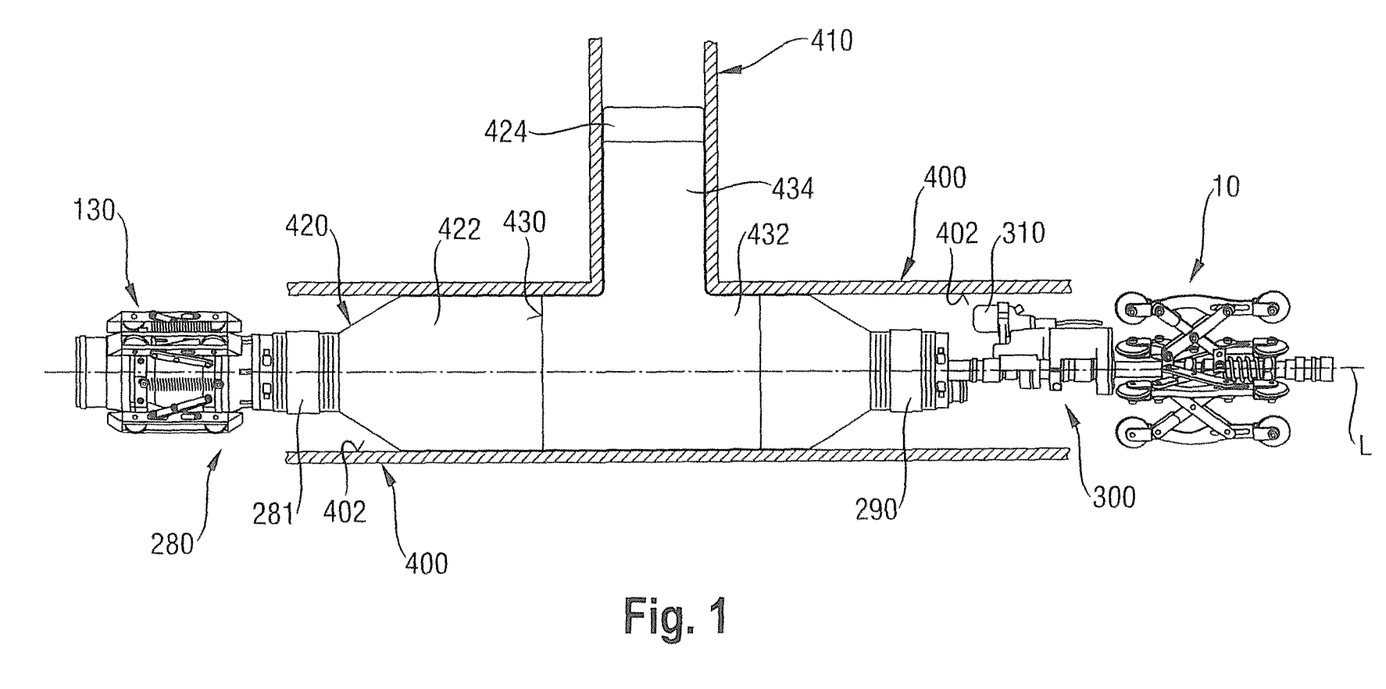
FIG. 1 a schematic view of the apparatus for rehabilitating pipelines according the invention with schematic indication of a lining element and a calibrating hose.

In FIG. 1 to 4, an embodiment of an apparatus for rehabilitating pipelines according to the invention is schematically shown, wherein in FIG. 1 the apparatus is provided with a calibrating hose 420 and a lining element 430. Furthermore, a main pipeline 400 and a lateral pipeline 410 in the form of a house connection pipe are shown as pipelines in FIG. 1. In contrast with FIG. 1, the calibrating hose 160 and the lining element 430 as well as the two pipelines 400, 410 have been omitted in FIG. 2 to 4. The calibrating hose 420 is connected to connection devices 280, 290, which are explained in more detail further down below, in an air-tight manner. The calibrating hose 420 comprises two sections, namely a main pipe calibrating hose 422 and a lateral pipe calibrating hose 424. The lining element 430 applied to the outside of the calibrating hose 420 likewise comprises two sections, namely a main pipe section 432 and a lateral pipe section 434. The situation shown in FIG. 1 relates to the end phase of a rehabilitation process, during which the rehabilitation apparatus according to the invention is employed. In this situation, the calibrating hose 420 is in the inflated state, as is indicated in FIG. 1, and with its main pipe calibrating hose 422, presses the main pipe section 432 against the pipe inner wall 402 of the main pipeline 400 and with its lateral pipe calibrating hose 424 presses the lateral pipe section 434 against the pipe inner wall of the lateral pipeline 410. The lining element 430 comprises a layer of resin-absorbable material and, in the shown state according to FIG. 1, is saturated with a resin which hardens. Following adequate hardening of the resin, the air is removed from the calibrating hose 420 and the rehabilitation apparatus can be driven out of the main pipeline 400 and removed via a manhole.

Figure 2:
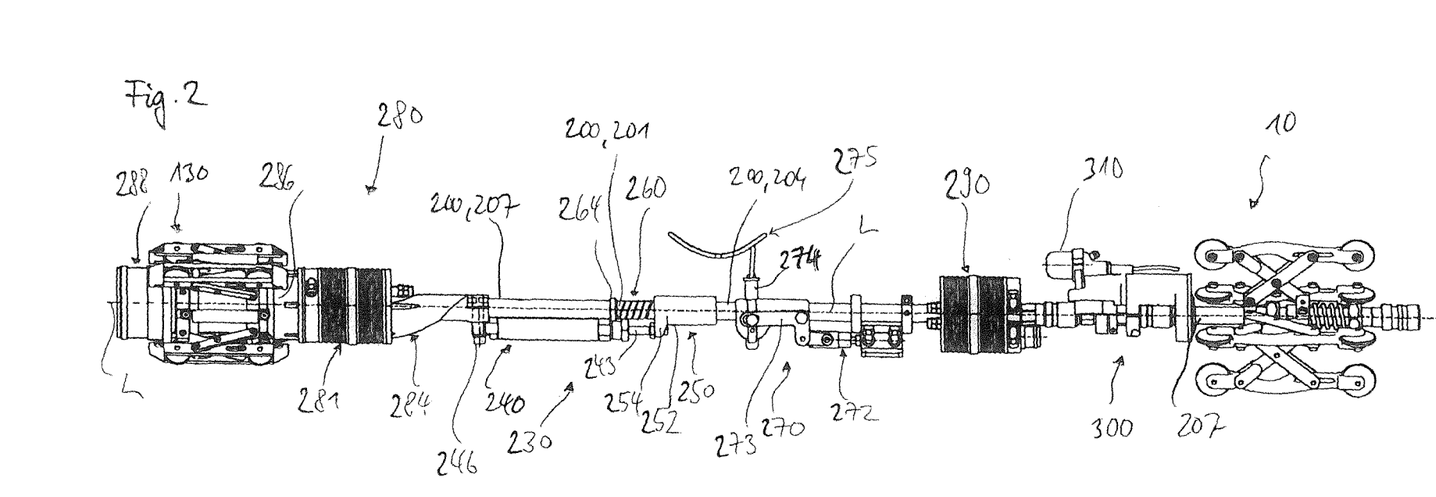
FIG. 2 a schematic view of the apparatus for rehabilitating pipelines according to the invention according to FIG. 1 without representation of the lining element and the calibrating hose.
Figure 3:
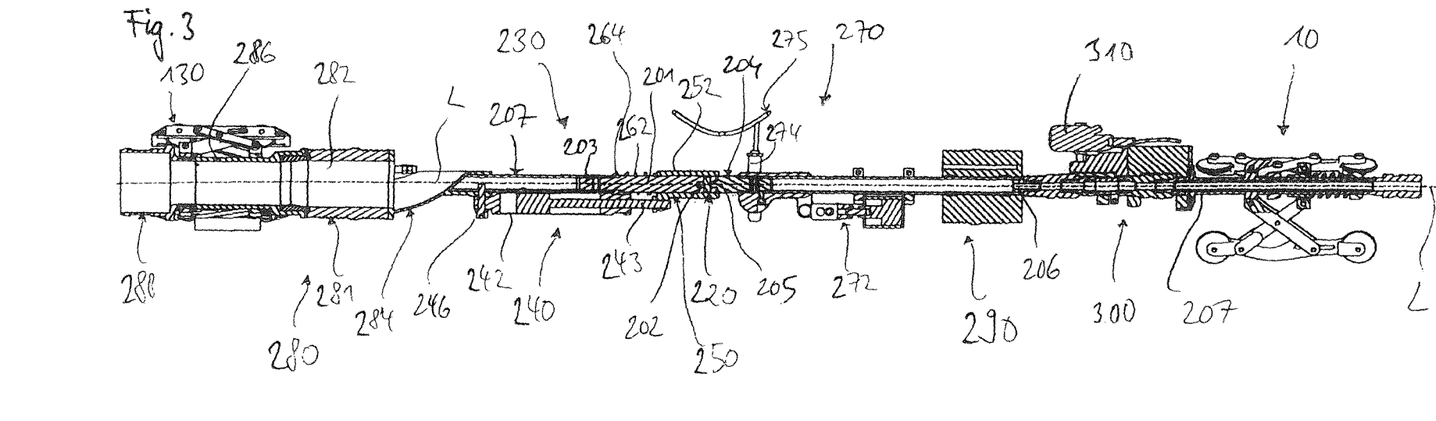
FIG. 3 a longitudinal section along the longitudinal axis and parallel to the drawing plane of the apparatus according to the invention according to FIG. 2.
Figure 4:
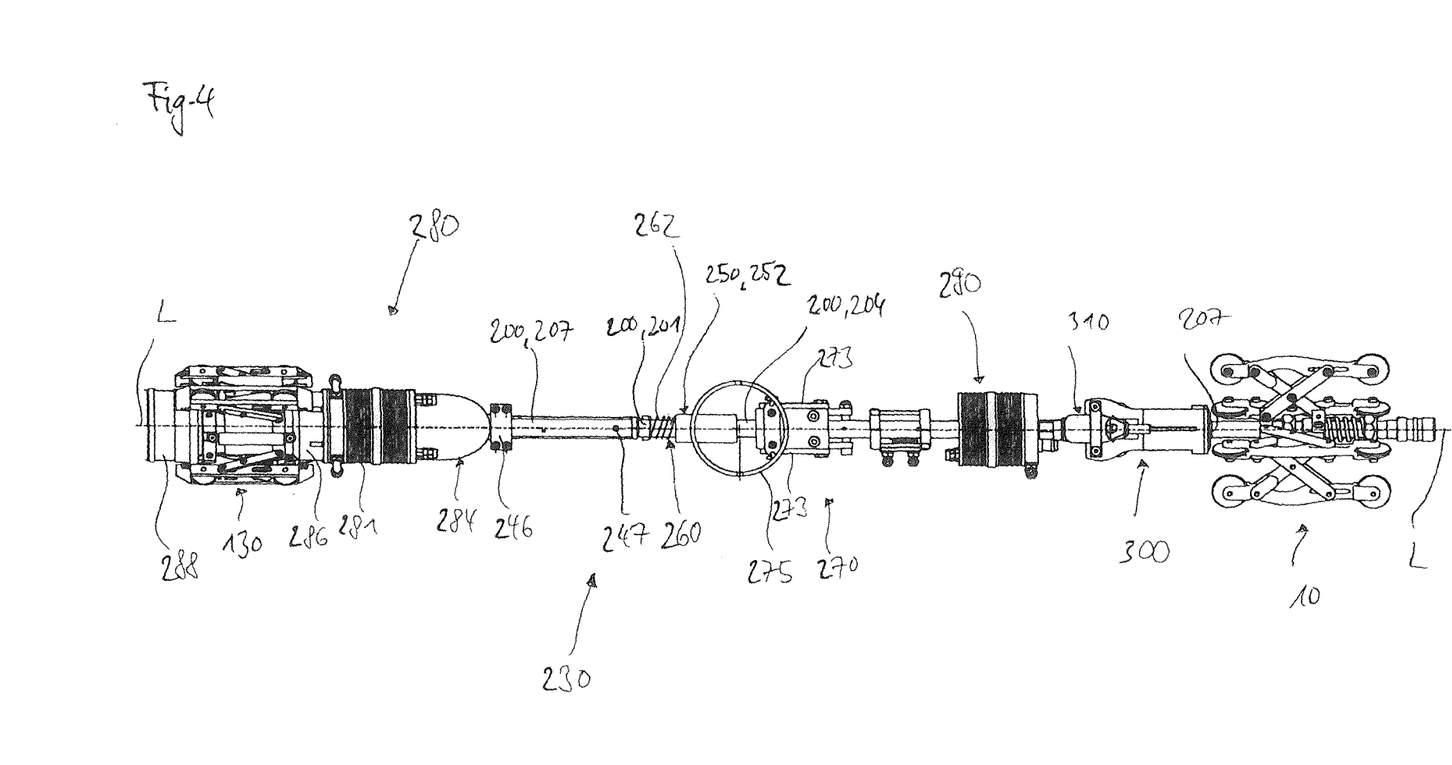
FIG. 4 a view from the top of the apparatus shown in FIG. 2.
Figure 5:
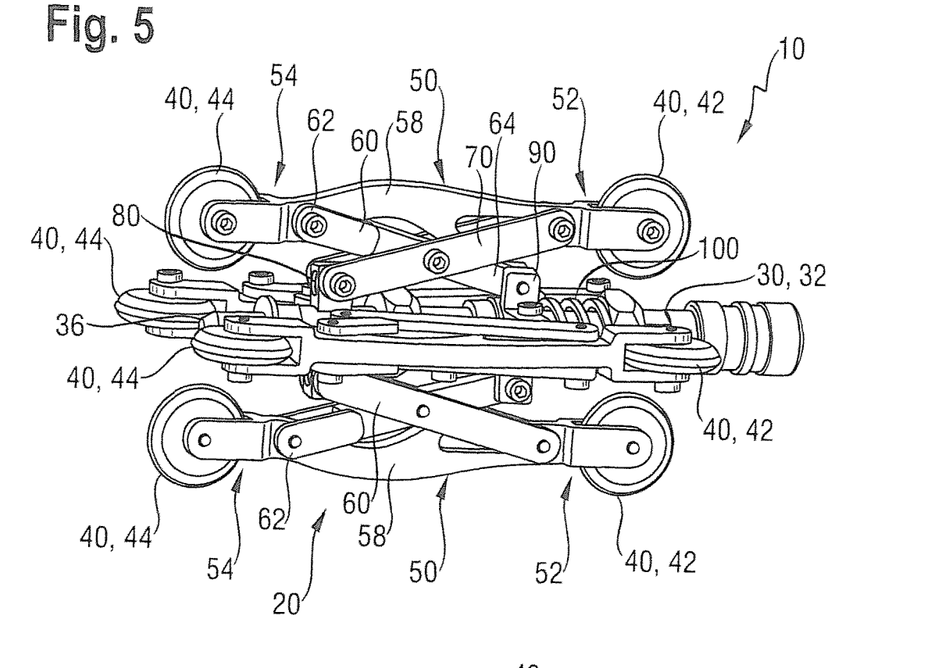
FIG. 5 a perspective view of a first embodiment of the travelling device according to the invention in a first undercarriage position.
Figure 6:
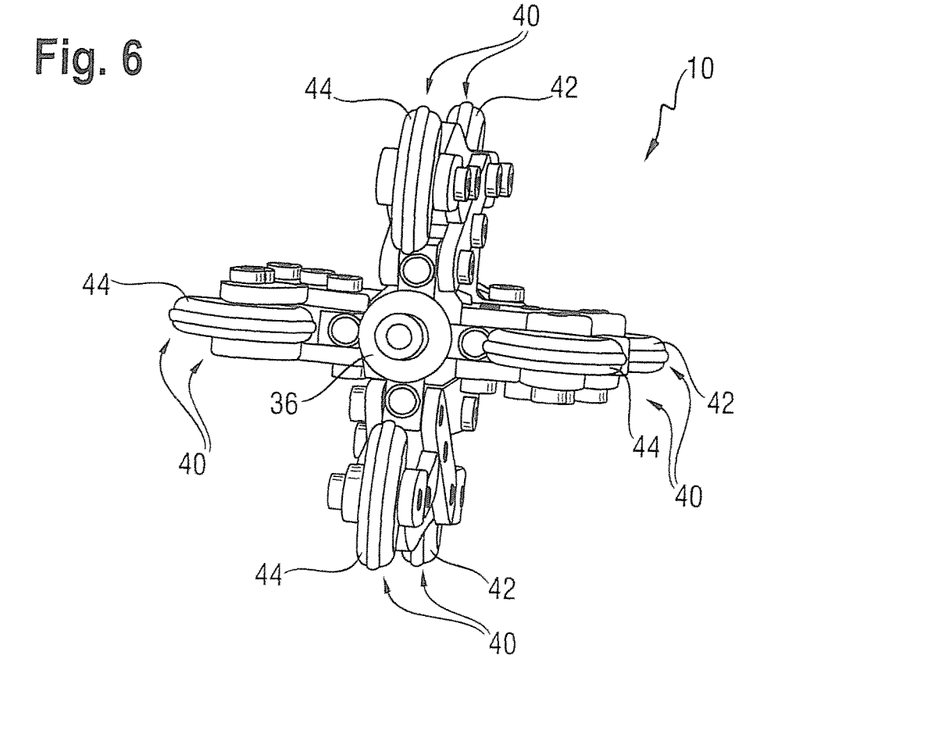
FIG. 6 a perspective view substantially from the back of the travelling device according to FIG. 5.

As already explained at the outset, the calibrating hose 420 and the lining element 430 are omitted in FIG. 2 to 4, so that all substantial parts of the rehabilitation apparatus can be seen. In the following, these FIGS. 2 to 4 and the detail representations according to FIGS. 5 and 6 are explained in more detail.

The rehabilitation apparatus comprises a support structure 200, on which the substantial function units of the rehabilitation apparatus are fastened. As substantial function units, a buckling mechanism 220, an actuating device 230, a lifting mechanism 270, a first connection device 280, a second connection device 290, a rotary drive 300 and a camera 310 are shown in FIG. 2 to 4.

The support structure 200 in the present exemplary embodiment comprises a first support structure element 201 with a first end 202 and a second end 203 as well as a second support structure element 204 with a first end 205 and a second end 206. On the second end 206 of the second support structure element 204, the rotary drive 300 is connected in order to make possible a turning of the support structure 200 about the longitudinal axis L. The support structure 200 furthermore comprises a third support structure element 207, which via the rotary drive 300 is connected to the second end 203 of the first support structure element 201. The travelling device 130 which is still explained further down is arranged on the third support structure element 207.

FIG. 1 shows a first embodiment of a travelling device 10 according to the invention, which is fastened to the third support element 207 of the rehabilitation apparatus. This first embodiment of the travelling device 10 is then obtained in enlarged representation from FIG. 5 to 9.

The travelling device 10 comprises an adjustable undercarriage 20 and a support device 30, to which the undercarriage 20 is fastened. The support device 30 comprises a rod element 32. At a first end of the rod element 32 a first coupling device 36 and at the second end of the rod element 32 located opposite, a second coupling device 38 are provided in order to be able to releasably fasten the rod element 32 to the support structure 200 of the rehabilitation apparatus. Furthermore, further elements of the support structure 200 and/or function units of the rehabilitation apparatus can be attached if required via the second coupling device 38.

The undercarriage 20 comprises a plurality of wheel sets 40, wherein each wheel set 40 comprises at least two wheels. In the exemplary embodiment shown in the FIGS. 5 to 9, four wheel sets 40 each with a first wheel 42 and a second wheel 44 are provided. The wheels 42, 44 of each wheel set 40 are rotatably mounted on a wheel holding element 50. As is evident, in particular, from FIG. 6, the four wheel sets 40 are arranged evenly distributed over the circumference, so that two wheel sets 40 each are located opposite one another. With each of the wheel sets 40, the first wheel 42 is rotatably mounted on a first end 52 of the wheel holding element 50 and the second wheel 44 on a second end 54 of the wheel holding element 50. As is evident from FIG. 5 to 7, each of the ends 52, 54 comprises a fork holding device for the rotatable mounting of the wheels 42, 44. Preferentially, the wheel holding element 50 is configured unitarily.

Each of the wheel holding elements 50 is adjustably connected to the support device 30 by means of a plurality of braces. As is shown by FIG. 5 to 9, each of the wheel holding elements 50 in this case is adjustably connected to the support device 30 by means of a first brace 60 and a second brace 70. In the present exemplary embodiment, the braces 60, 70 are configured as scissor linkage. Here, a first end 62 of the first brace 60 is rotatably attached to the wheel holding element 50. Furthermore, the undercarriage comprises a first connection unit 80, which is attached to the support device 30 in a fixed manner. Furthermore, a second connection unit 90 is provided, which is arranged on the support device 30 in a displaceable manner with respect to the latter. A second end 64 of the first brace 60 is rotatably connected to the second displaceable connection unit 90. The first connection unit 80 comprises a sleeve element 82 with a plurality of protrusions 84. The sleeve element 82 is moveably arranged on the support device 30, in particular on the rod element 32. The protrusions 84 serve for the fastening of the braces 60, 70. In a similar manner, the second connection unit 90 comprises a sleeve element 92 with a plurality of protrusions 94, wherein the sleeve element 92 is displaceably coupled to the support device 30 and the protrusions 94 serve for the rotatable connection of the braces 60, 70. A first end 72 of the second brace 70 is displaceably mounted in a guide groove 56 of the wheel holding element 50. A second end 74 of the second brace 70 is rotatably attached to the first connection unit 80.

Furthermore, the second connection unit 90 is preloaded by means of a spring unit 100 in such a manner that the wheels 42, 44 of each wheel set 40 are pushed in the direction away from the support device 30 to the outside. In this manner it is achieved that the wheels 42, 44 bear against the pipe inner wall of the pipeline with an adequate contact pressure and because of this the rehabilitation apparatus can be moved along the pipeline by means of the travelling device 10. Furthermore, a first adjusting unit 110 with an adjusting nut 112 and a second adjusting unit 120 with an adjusting nut 122 are provided. By means of the first adjusting unit 110, the spring unit, in particular its spring force, is adjusted and can thus be adapted to the respective diameter of the pipeline. By means of the second adjusting unit 120, the maximum adjustment of the undercarriage 20 with respect to a direction directed from the rod element 32 to the outside, can be adjusted. In this manner it is possible to employ the travelling device 10 for different pipe diameters.

In order to prevent the frequently occurring problem of a jamming of a wheel 42, 44 in the pipeline, the wheel holding element 50 comprises a spacer 58. This spacer 58 is configured in such a manner that the wheel 42, 44 or the wheel holding element 50 does not jam in the pipeline when moving the rehabilitation apparatus. Preferentially, the spacer 58 is formed by a protrusion of the wheel holding element 50. Here, the protrusion is preferentially formed in the shape of an arc, in particular in the shape of a bulge. The spacer 58 serves to be able to maintain a distance between the inner wall of the pipeline and the outer edge of the wheel holding element 50 located opposite in the regions outside the bulge. In this manner it is prevented, for example, that in the case of major irregularities or obstacles in the pipeline the wheel set 40 that is present in the region of the pipe bottom no longer runs evenly along the pipe inner wall, but slightly raised on one side relative thereto.

Figure 8:
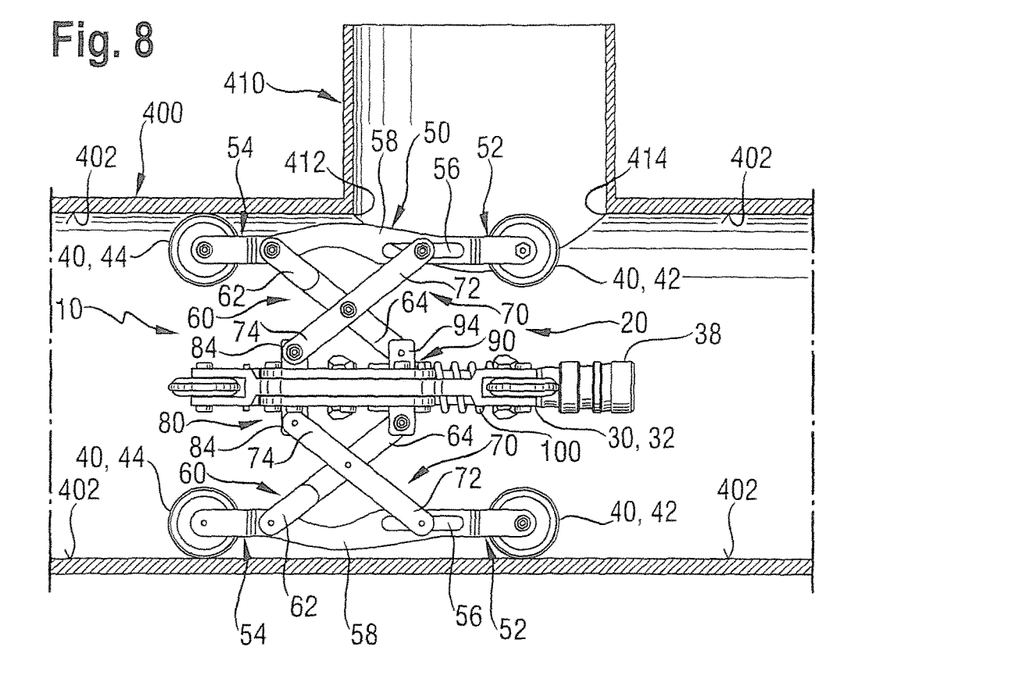
FIG. 8 a lateral view of the travelling device according to FIG. 7 in a pipeline cut in longitudinal direction in a first position along the longitudinal direction of the pipeline.
Figure 9:
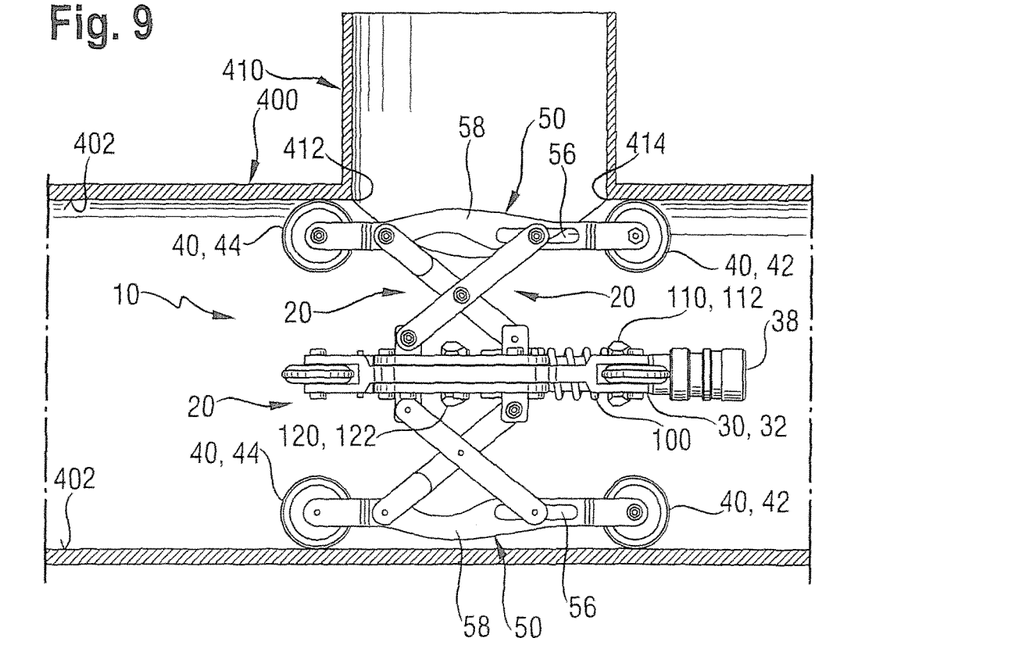
FIG. 9 a representation similar to that shown in FIG. 8, wherein the travelling device is located in a second position along the longitudinal direction of the pipeline, and FIG. 10 a perspective view of a second embodiment of the travelling device according to the invention.

In order to further explain this mode of operation, reference is made to FIGS. 8 and 9 in the following. FIG. 8 shows a situation, wherein the travelling device 10 because of a displacement of the rehabilitation apparatus along the indicated arrow, is partially located in the region of a lateral pipe connection. Here, the second wheel 44 of each wheel set 40 bears against the pipe inner wall 402 of the main pipeline 400. The first wheel 42 of the upper, fourth wheel set 40 is located in the connection region of the lateral pipeline 410 and does not therefore bear against any pipe inner wall. The remaining second wheels 44 of the three other wheel sets 40 bear against the pipe inner wall 402 of the main pipeline 400.

In the situation shown in FIG. 8, a small distance is evident between the outer edge of the spacer 58 and the pipe inner wall 402 of the main pipeline 400 in the region of an edge 412, but which is merely shown schematically. When the first wheels 42 of the wheel sets 40, for example as a consequence of an irregularity or an obstacle in the main pipeline 400, are now slightly lifted upwards, the outer edge of the spacer 58 contacts the pipe inner wall 402 of the main pipeline 400 and prevents a further upward movement of the first wheel 42. Here, the distance between the outer edge of the spacer 58 and the pipe inner wall 402, i.e. the distance between the outer edge of the spacer 58 and the connecting line of the tangents of the wheels 42, 44 can be selected so that even in the event that the outer edge of the spacer 58 bears against the pipe inner wall 402, the first wheel 42 can roll off an edge 414 located opposite the edge 412, in order to be able to be guided into the main pipeline 400 again. This situation is then shown in FIG. 9, in which all wheels 42, 44 of all wheel sets 40 again bear against the pipe inner wall 402 of the main pipeline 400.

Figure 7:
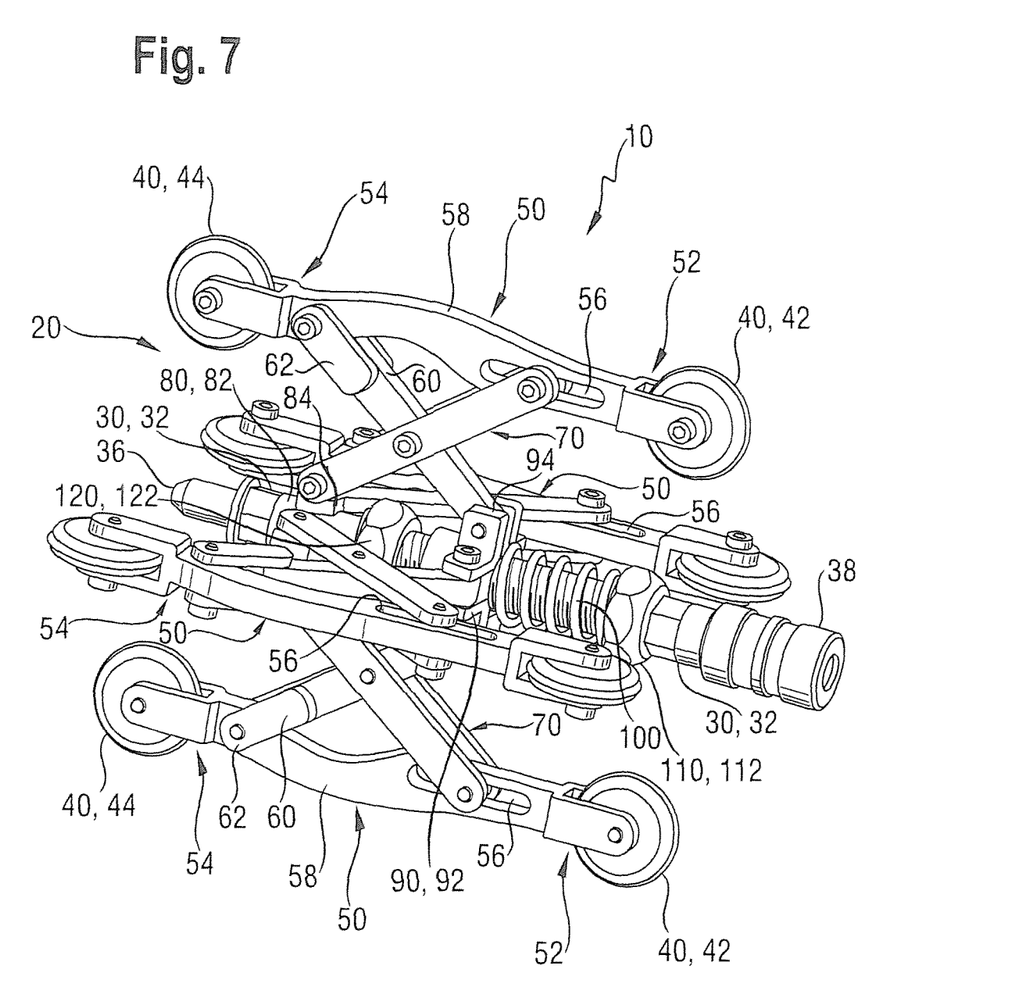
FIG. 7 a perspective view of the first embodiment of the travelling device in a second undercarriage position.

Finally, two possible positions of the undercarriage 20 are shown in FIG. 5 to 7. Here, a retracted position of the undercarriage 20 as a first undercarriage position is shown in FIGS. 5 and 6, which for example serves for being able to introduce the travelling device 10 into the main pipeline 400 together with the rehabilitation apparatus. In order to achieve this first undercarriage position of the undercarriage 20, the first adjusting unit 110 can be suitably adjusted by means of the adjusting nut 112, so that only a minor spring force is exerted on the second connection unit 90. FIG. 7 shows an extended position of the undercarriage 20 as a second undercarriage position, as is required in FIGS. 8 and 9 for moving the travelling device 100 and the rehabilitation apparatus. In this second undercarriage position, the wheels 42, 44 are pressed against the pipe inner wall 402 of the main pipeline 400.

Figure 10:
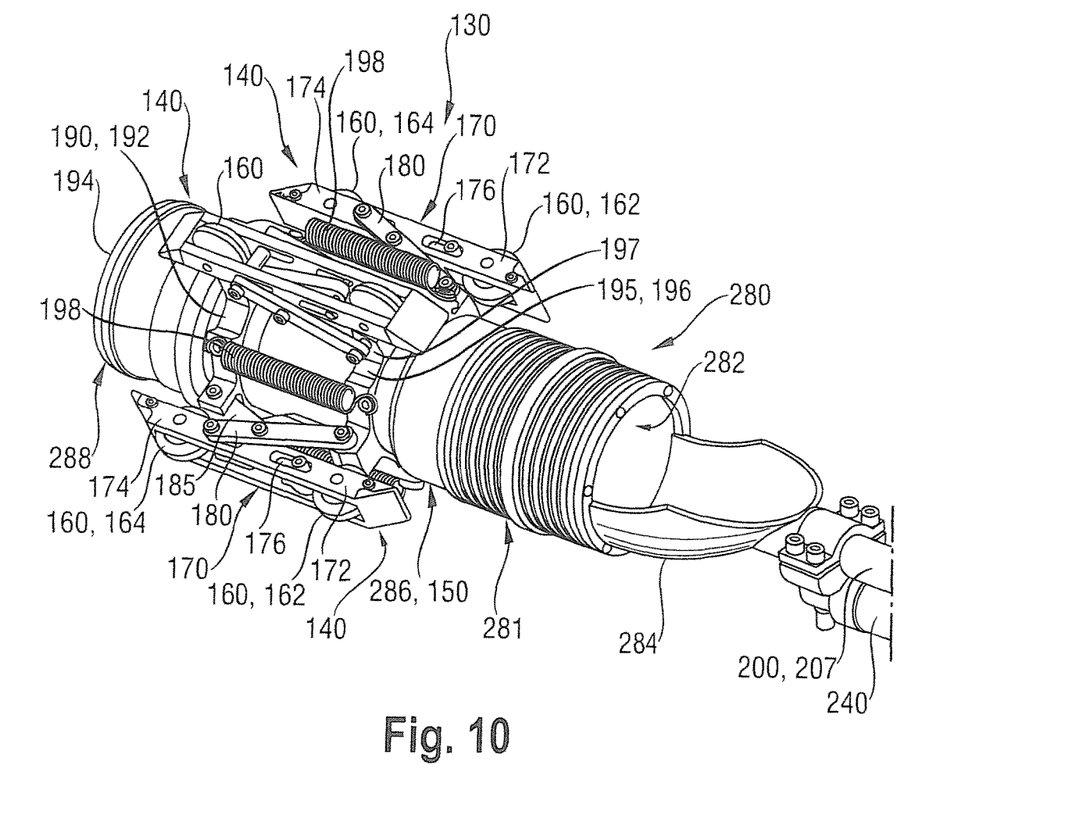

As is evident from FIG. 1 to 4, the rehabilitation apparatus comprises a further travelling device 130, which is then evident in more detail from FIG. 10. The travelling device 130 comprises a undercarriage 140 and a support device 150. The support device 150 comprises the support element 286 explained further up in the shape of a hollow cylinder element.

FIG. 10 shows the undercarriage 140 in a retracted position as a first undercarriage position, similar to that in FIGS. 5 and 6. Like the undercarriage 20, the undercarriage 140 can be brought into an extended position as a second undercarriage position, in which the wheels are pressed against the pipe inner wall 402 of the main pipeline 400.

The undercarriage 140 comprises a plurality of wheel sets 160, wherein each wheel set 160 comprises at least two wheels. In the exemplary embodiment shown in FIG. 10, four wheel sets 160 each with a first wheel 162 and a second wheel 164 are provided. The wheels 162, 164 of a respective wheel set 160 are rotatably mounted on a wheel holding element 170. As is evident from FIGS. 1 to 4 and 10, the four wheel sets 160 are arranged evenly distributed over the circumference, so that two wheel sets 160 are located opposite each other in each case. With each of the wheel sets 160, the first wheel 162 is rotatably mounted on a first end 172 of the wheel holding element 170 and the second wheel 164 on a second end 174 of the wheel holding element 170. Each of the ends 172, 174 comprises a fork holding device for the rotatable mounting of the wheels 162, 164. As is evident from FIG. 10, two wheel holding parts are provided for each wheel holding element 170, which are arranged spaced from and parallel to each other. These wheel holding parts are interconnected at their ends with end pieces. Between the wheel holding parts, the wheels 162, 164 are mounted.

Each of the wheel holding elements 170 is adjustably connected to the support device 150 by means of a plurality of braces. Here, each of the wheel holding elements 170 is adjustably connected to the support device 150 by means of a first brace 180 and a second brace 185. In the present exemplary embodiment, the support device 150 is embodied as hollow cylinder element 286 and the braces 180, 185 are embodied as scissor linkage. Here, a first end of the first brace 180 is rotatably attached to the wheel holding element 170. Furthermore, the undercarriage 140 comprises a first connection unit 190, which is attached to the support device 150 in a fixed manner. Furthermore, a second connection unit 195 is provided, which is displaceably arranged on the latter with respect to the support device 150. A second end of the first brace 180 is rotatably connected to the second displaceable connection unit 195. The first connection unit 190 comprises a sleeve element 192 with a plurality of protrusions 194. The sleeve element 192 is moveably arranged on the support device 150, in particular the support element 286. The protrusions 194 and 197 serve for the fastening of the braces 180, 185. In a similar manner, the second connection unit 195 comprises a sleeve element 196 with a plurality of protrusions 197, wherein the sleeve element 196 is displaceably coupled to the support device 150 and the protrusions 197 serve for the rotatable connection of the braces 180, 185. A first end of the second brace 185 is displaceably mounted in a guide groove 176 of the wheel holding element 170. A second end of the second brace 185 is rotatably attached to the first connection unit 190.

Furthermore, the second connection unit 195 is preloaded by means of a plurality of spring units 198 in such a manner, that the wheels 162, 164 of each wheel set 160 are pushed in the direction away from the support device 150 to the outside. In this manner it is achieved that the wheels 162, 164 bear against the pipe inner wall of the pipeline with an adequate contact pressure and because of this the rehabilitation apparatus can be moved along the main pipeline 400 by means of the travelling device 10. The travelling device 130 comprises at least two spring units. These can be arranged opposite each other with respect to the support device 150. In the present exemplary embodiment according to FIG. 10, four spring units 198 are provided for example. An end each of a spring unit 198 can be attached to the first connection unit 190 and the respective other end of a spring unit 198 can be attached to the second connection unit 195. Fastening of the spring ends to the connection units 190, 195 can be carried out as releasable fastening, in particular, in order to make possible a simple and rapid exchanging of the springs. In order to adapt the spring force of the spring units 198 to the respective diameter of the pipeline, the entire set of four spring units 198 can thus be easily and quickly disassembled and replaced with another set of spring units having a different predefined spring force. By means of the other set of spring units, the desired other adjustment of the undercarriage 140 can be achieved. In this way it is possible to employ the travelling device for different pipe diameters.

As explained above with regard to the FIGS. 5 to 9, the wheel holding elements 170 of the travelling device 130 can also comprise one or a plurality of spacers in order to prevent the jamming of a wheel 162, 164 in the pipeline. This spacer (not shown) can be suitably configured, as explained above with regard to the spacer 58.

The buckling mechanism 220 is evident, in particular from FIG. 2 to 4, which interconnects the first support structure element 201 and the second support structure element 204. By means of this buckling mechanism 220, at least one of the support structure elements 201, 204 can be brought into a buckling position by means of the actuation device 230. In this buckling position, for example the first support structure element 201 and the other elements of the support structure and function units fastened thereon extend at an angle relative to the longitudinal axis L. The embodiment of the buckling mechanism 220 is evident in particular from FIG. 3. Accordingly, the first end 202 of the first support structure element 201 comprises a groove and the first end 205 of the second support structure element 204 a spring, wherein the groove and the spring are rotatably interconnected via a pin. The pin extends along an opening in a substantially perpendicular direction to the longitudinal axis A.

Furthermore, the actuation device 230 is embodied in such a manner that the buckling mechanism 220 can be brought into a buckling release position and into a buckling lock position by means of the actuation device 230. The actuation device 230 comprises a driving device 240, a locking element 250 and a spring unit 260. The driving device 240 is preferentially a linear drive with a pneumatic cylinder 242 as displaceable cylinder. The pneumatic cylinder 242 is fastened to the first support structure element 201 by means of two fastening elements 246 and 247. To this end, an end region of the pneumatic cylinder 242 is connected to the third support structure element 207 in a fixed manner with the fastening element 246, which comprises a clamp engaging about the third support structure element 207. In the front region, the pneumatic cylinder 242 is fastened to the first support structure element 201 by means of a screw as fastening element 247. The pneumatic cylinder 242 preferentially is a double-acting pneumatic cylinder, which has a connection and two lines for feeding and/or discharging a fluid medium for activating the pneumatic cylinder (not shown).

Furthermore, the actuation device 230 comprises the locking element 250, which for releasing the buckling mechanism 220 can be brought into a release position and for locking the buckling mechanism 220 can be brought into a locking position. In the situation shown in FIG. 2 to 4, the locking element 250 is in the locking position and the buckling mechanism 220 in its buckling lock position. The locking element 250 comprises a displaceable sleeve 252, which surrounds the first end 202 of the first support structure element 201 and, in the locking position, partially at least also the first end 205 of the second support structure element 204. The sleeve 252 is operatively coupled to the driving device 240. For this purpose, the sleeve 252 comprises a connection in the shape of a protrusion 254 with an opening. An end of the piston rod 243 of the pneumatic cylinder 242 engages into the opening and is connected therewith in a fixed manner. In this manner, the sleeve 252, through a stroke movement of the piston rod 243, can be displaced along the stroke travel and thus parallel to the longitudinal axis L in order to be able to transfer the locking element 250 from the release position into the locking position and vice versa and because of this the buckling mechanism 220 into the buckling release position and the buckling lock position and vice versa.

Finally, the actuation device 230 comprises a spring unit 260 which preloads the locking element 250 in the locking position. To this end, the spring unit 260 comprises a spring 262, in particular a coil spring, and a stop 264. On this stop 264, the spring 262 supports itself and as a result of its preload, pushes the sleeve 252 in a direction away from the stop 264. In the relaxed state of the spring 262, the sleeve 252 is in the locking position. In order to transfer the sleeve 252 and thus the locking element 250 from the locking position into the release position, the pneumatic cylinder 242 is actuated in order to displace the sleeve 252 by means of the piston rod 243 against the preload of the spring 262. The actuation of the pneumatic cylinder 242 can be carried out via a control, which supplies compressed air via a line and a connection. The control can be operated by an operator via remote control.

Alternatively to the shown embodiment, a configuration without spring unit 260 is also possible, wherein the driving device 240 is then configured in such a manner that the locking element 250 can be moved in two directions.

FIG. 2 to 4 furthermore show the lifting mechanism 270 already mentioned above with a pneumatic cylinder 272, a toggle lever 273, a support frame 274 and an alignment body 275. In this regard, we refer to the European Patent 1 519 100 B1 and hereby include the technical teaching explained there in this respect in the content of the present disclosure. Accordingly it is provided, in particular, that the lifting mechanism 270 comprises a pneumatic cylinder 272 and a toggle lever 273 on both sides of the support structure element. On the free end of the toggle levers 273 a support frame 274 is fastened, which carries a preferentially ring-shaped alignment body 275. Because of this, the alignment body 275 can be moved substantially perpendicular to the longitudinal axis L. When the pneumatic cylinder 272 is pressurised, the alignment body 275 is moved upwards via the lifting mechanism 270 until the alignment body 275 is located in the mouth region of the lateral pipeline 410. Furthermore a spring means is provided, which presses the alignment body 275 in the direction of the mouth of the lateral pipeline 410 in an elastically resilient manner and makes possible a displacement of the alignment body 275, until it engages in the mouth of the lateral pipeline 410. In the case that the alignment body 275 is not located exactly with respect to the mouth of the lateral pipeline 410 and bears against an edge 412, 414 of the main pipeline 400, the alignment body 275, following a displacement and/or rotation of the rehabilitation apparatus, can slide into or be pushed into the mouth of the lateral pipeline 410 because of the spring pressing-on force.

As is evident, in particular, from FIGS. 2 and 3, a connection device altogether designated with the reference number 280 is connected to the third support structure element 207. This connection device 280 comprises a connection element 281 in the form of a hollow cylinder with a middle opening 282, a guide element 284, a support element 286 and an end-sided connection 288. The support element 286 and the connection 288 are likewise embodied in the form of a hollow cylinder and each comprise a middle opening. The middle openings of connection element 281, support element 286 and connection 288 are embodied approximately identical in size and form a passage together with the guide element 284. This passage, especially in the event that a longer section of a lateral pipeline 410 has to be provided with a correspondingly long lateral pipe section 434 of the lining element 430, serves to make it possible that the lateral pipe calibrating hose 424 which is then likewise longer can be introduced together with the lateral pipe section 434 via this passage into a carrier hose (not shown) connected to the connection 288 before introducing the rehabilitation apparatus into the pipeline system. If then, during the rehabilitation process, the lateral pipe section 434 is introduced into the lateral pipeline 410 together with the lateral pipe calibrating hose 424, the unit of lateral pipe calibrating hose 424 and lateral pipe section 434 can be guided out of the carrier hose via the passage and the guide element 284 in the direction of the mouth of the lateral pipeline 410. A further advantage of the configuration of the connection device 280 consists in that the support element 286 can be utilised for supporting the travelling device 130. Thus, a compact connection device 280 is made possible.

On the opposite side of the rehabilitation apparatus, a connection device 290 is fastened to the second support structure element 204. This connection device 290 has a cylindrical shape. Next to the connection device 290, the rotary drive 300 is provided, which serves, in particular for being able to rotate the rehabilitation apparatus about the longitudinal axis L so that the alignment body 275 in the region of the lateral pipe connection can be introduced into the mouth region by means of the lifting mechanism 270. In order to be able to carry out a visual inspection the camera 310 is attached.

As is evident from FIG. 1, the connection element 281 and the connection device 290 serve for the air-tight fastening of the calibrating hose 420 to the rehabilitation apparatus. For this purpose, the ends of the calibrating hose 420 are placed on the outer circumferential surface of connection element 281 and connection device 290 and fastened in an air-tight manner by means of clamps, adhesive tape or the like.

LIST OF REFERENCE NUMBERS

| | |
|---|---|
| 10 | Travelling device |
| 20 | Undercarriage |
| 30 | Support device |
| 32 | Rod element |
| 36 | First coupling device |
| 38 | Second coupling device |
| 40 | Wheel set |
| 42 | First wheel |
| 44 | Second wheel |
| 50 | Wheel holding element |
| 52 | First end |
| 54 | Second end |
| 56 | Guide groove |
| 58 | Spacer |
| 60 | First brace |
| 62 | First end |
| 64 | Second end |
| 70 | Second brace |
| 72 | First end |
| 74 | Second end |
| 80 | First connection unit |
| 82 | Sleeve element |
| 84 | Protrusions |
| 90 | Second connection unit |
| 92 | Sleeve element |
| 94 | Protrusions |
| 100 | Spring unit |
| 110 | First adjusting unit |
| 112 | Adjusting nut |
| 120 | Second adjusting unit |
| 122 | Adjusting nut |
| 130 | Travelling device |
| 140 | Undercarriage |
| 150 | Support device |
| 160 | Wheel set |
| 162 | First wheel |
| 164 | Second wheel |
| 170 | Wheel holding element |
| 172 | First end |
| 174 | Second end |
| 176 | Guide groove |
| 180 | First brace |
| 185 | Second brace |
| 190 | First connection unit |
| 192 | Sleeve element |
| 194 | Protrusions |
| 195 | Second connection unit |
| 196 | Sleeve element |
| 197 | Protrusions |
| 198 | Spring unit |
| 200 | Support structure |
| 201 | First support structure element |
| 202 | First end |
| 203 | Second end |
| 204 | Second support structure element |
| 205 | First end |
| 206 | Second end |
| 207 | Third support structure element |
| 220 | Buckling mechanism |
| 230 | Actuating device |
| 240 | Driving device |
| 242 | Pneumatic cylinder |
| 243 | Piston rod |
| 246 | Fastening element |
| 247 | Fastening element |
| 250 | Locking element |
| 252 | Sleeve |
| 254 | Protrusion |
| 260 | Spring unit |
| 262 | Spring |
| 264 | Stop |
| 270 | Lifting mechanism |

-continued

| 272 | Pneumatic cylinder |
| 273 | Toggle lever |
| 274 | Support frame |
| 275 | Alignment body |
| 280 | Connection device |
| 281 | Connection element |
| 282 | Opening |
| 284 | Guide element |
| 286 | Support element |
| 288 | Connection |
| 290 | Connection device |
| 300 | Rotary drive |
| 310 | Camera |
| 400 | Main pipeline |
| 402 | Pipe inner wall |
| 410 | Lateral pipeline |
| 412 | Edge |
| 414 | Edge |
| 420 | Calibrating hose |
| 422 | Main pipe calibrating hose |
| 424 | Lateral pipe calibrating hose |
| 430 | Lining element |
| 432 | Main pipe section |
| 434 | Lateral pipe section |
| L | Longitudinal axis |

The invention claimed is:

1. A travelling device for an apparatus for rehabilitating pipelines, comprising an adjustable undercarriage and a support device to which the undercarriage is fastened, and the undercarriage including a plurality of wheel sets, each wheel set comprising at least first and second wheels which are rotatably mounted in spaced-apart fashion on a rigid wheel holding element, the wheel holding element comprising a nonrotatable spacer formed by a protrusion of the wheel holding element, the spacer positioned entirely intermediate the spaced-apart wheels of the wheel set, and the spacer configured so that the spacer comes into contact with an inner wall of a pipeline in order to prevent the wheels of the wheel sets from jamming in the pipeline when moving the device.

2. The travelling device according to claim 1, wherein the first wheel of the wheel set is rotatably mounted on a first end of the wheel holding element and the second wheel of the wheel set is rotatably mounted on a second end of the wheel holding element.

3. The travelling device according to claim 1, wherein the wheel holding element is adjustably connected to the support device by means of braces.

4. The travelling device according to claim 3, wherein a plurality of the braces are embodied as a scissor linkage.

5. The travelling device according to claim 4, wherein the wheel holding element comprises a guide groove in which an end of a brace is guided.

6. The travelling device according to claim 1, wherein the protrusion is formed in the shape of a bulge.

7. The travelling device according to claim 3, further comprising a first connection unit which is attached to the support device in a fixed manner, and a second connection unit which is arranged moveably with respect to the support device, wherein a brace of each wheel set is rotatably connected to the first connection unit and another brace of each wheel set is rotatably connected to the second connection unit.

8. The travelling device according to claim 7, wherein the second connection unit is preloaded by means of at least one spring unit in such a manner that the wheels are pushed in the direction away from the support device.

9. The travelling device according to claim 8, wherein at least one adjusting unit is provided, with which the at least one spring unit and/or a maximum adjustment of the undercarriage is adjustable relative to the support device.

10. The travelling device according to claim 1, wherein the support device comprises at least one coupling device for connecting the undercarriage to a support structure of the apparatus for rehabilitating pipelines.

11. The travelling device according to claim 1, wherein the support device is a hollow cylinder element or a rod element.

* * * * *